(12) United States Patent
Tran

(10) Patent No.: US 8,696,229 B2
(45) Date of Patent: Apr. 15, 2014

(54) AUTOMATIC LOCKING TELESCOPIC SLIDE

(76) Inventor: Kien Chi Tran, San Francisco, CA (US)

( * ) Notice: Subject to any disclaimer, the term of this patent is extended or adjusted under 35 U.S.C. 154(b) by 308 days.

(21) Appl. No.: 13/371,017

(22) Filed: Feb. 10, 2012

(65) Prior Publication Data

US 2012/0207534 A1    Aug. 16, 2012

Related U.S. Application Data

(60) Provisional application No. 61/441,765, filed on Feb. 11, 2011.

(51) Int. Cl.
*F16B 7/10* (2006.01)
(52) U.S. Cl.
USPC ... 403/109.4; 403/109.5; 296/76; 296/193.11
(58) Field of Classification Search
CPC ........... B62D 25/12; E05C 17/30; F16B 7/02; F16B 7/025; F16B 7/1418
USPC ................... 296/76, 193.11; 180/69.2, 69.21; 403/109.1, 109.4, 109.5, 377, 374.4; 292/339
See application file for complete search history.

(56) References Cited

U.S. PATENT DOCUMENTS

| | | | | |
|---|---|---|---|---|
| 1,365,829 A | * | 1/1921 | Hurd | 292/275 |
| 2,144,126 A | * | 1/1939 | Schallis | 217/60 F |
| 2,840,402 A | * | 6/1958 | Hassel | 403/374.4 |
| 4,062,583 A | | 12/1977 | Taylor | |
| 4,070,050 A | | 1/1978 | Glock et al. | |
| 4,449,702 A | * | 5/1984 | Hasegawa | 267/64.12 |
| 5,131,115 A | * | 7/1992 | Sarto | 16/82 |
| 5,228,737 A | | 7/1993 | Zimmerman | |
| 5,238,213 A | * | 8/1993 | Pool | 292/338 |
| 5,575,513 A | | 11/1996 | Tuttle | |
| 6,244,650 B1 | | 6/2001 | Namvari | |
| 6,428,062 B1 | | 8/2002 | Rochl | |
| 7,731,165 B2 | | 6/2010 | Schmidt | |
| 7,887,031 B2 | * | 2/2011 | Murota et al. | 267/64.12 |

* cited by examiner

*Primary Examiner* — Michael P Ferguson
(74) *Attorney, Agent, or Firm* — Steven A. Nielsen; Allman & Nielsen, P.C.

(57) ABSTRACT

A hood prop is adjustable by rotation and without tools. A base rod 33 fits into a hollow friction rod 34 and may be twisted in a first direction to lock in place and in a second opposite direction to loosen for adjustment. A base screw 32 secures a free floating friction piece 31 and a threaded base piece 30 to a threaded base rod 33. The treaded base rod 33 may be inserted into the hollow friction rod 34 and then twisted. The rotation causes the free floating friction piece to press upon the inside wall of the hollow friction rod. The slant surfaces of the free floating friction piece and threaded base piece help move an extended section 40 of the friction piece into the inner wall of the hollow friction rod. The use of two slant surfaces 61 on the threaded base piece 30 facilitates quick response to rotation in either direction.

1 Claim, 17 Drawing Sheets

AUTOMATIC LOCKING TELESCOPIC SLIDE

CROSS-REFERENCE TO RELATED APPLICATIONS

This is a utility application based upon U.S. patent application Ser. No. 61/441,765 filed on Feb. 11, 2011. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic, cited or referred to in this application.

BACKGROUND OF THE INVENTION (1) Field of the Invention

The invention generally relates to telescopic slide assemblies. More particularly, the invention relates to means and methods of telescopic and expandable slides with twist locks used to prop open a car hood or trunk.

(2) Description of the Related Art

Several slide type devices are known in the related art. For example, U.S. Pat. No. 4,062,583 by Taylor discloses a telescopic support that supports the inside surface of an automobile trunk. Taylor uses a system of pins that go through a support tub. The pins require two hands to adjust and may require the use of tools.

U.S. Pat. No. 4,070,050 by Glock et al discloses a solid bar telescopically inserted within an outer tube. A bulky exterior coil spring is used to adjust the length of the mechanism.

U.S. Pat. No. 6,428,062 by Roehl discloses a telescopic mechanism using a spring and latching member to adjust the overall length of the assembly.

BRIEF SUMMARY OF THE INVENTION

The present invention overcomes shortfalls in the related art by presenting an unobvious and unique combination and configuration telescopic members and internal friction members that toollessly lock and unlock two sliding members for length adjustment.

One of the main advantages of this invention is the use and design of a free floating friction piece that has one 45 degree slant surface and floats upon a base screw. The free floating friction piece is sometimes moved against a base piece, the base piece having two 45 degree slant surfaces. The base piece has internal treads and is in close contact with the treads of the base screw. When torque is applied to a joining telescopic members, the free floating friction piece will be urged past the outside circumference of the base piece and apply friction to the inner wall of a hollow friction rod.

In one contemplated embodiment, a user may insert a base rod into a friction rod to achieve a desired assembly length. The relative positions of the two rods are secured by twisting the rods in a first direction, causing the free floating friction piece to press upon the inner wall of the hollow friction rod. A user may then rotate the two rods in a second direction to release the two rods. The system is self-adjusting and self-maintaining as the base piece has two slant surfaces to accommodate any rotation of the free floating friction piece.

The present invention overcomes shortfalls in the related art by providing an easy to maintain system of locking that does not require the use of tools or special skill.

In one contemplated use of the disclosed slide system, the trunk or hood of a vehicle may be propped open in an efficient, functional and attractive manner.

These and other objects and advantages will be made apparent when considering the following detailed specification when taken in conjunction with the drawings.

Figure 1:
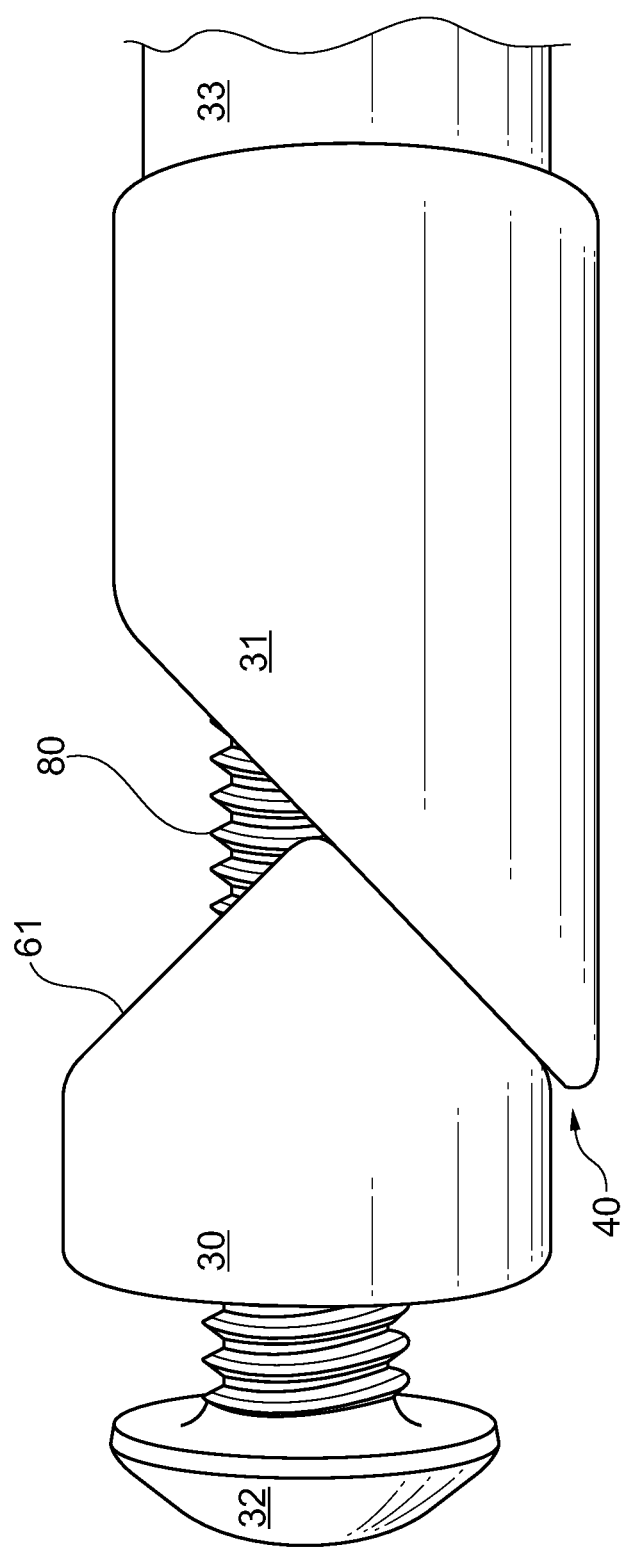
FIG. 1 is a perspective view of a base screw holding various components to a base rod.

REFERENCE NUMERALS IN THE DRAWINGS 10 one embodiment of the invention in general
30 threaded base piece or base piece
31 free floating friction piece or friction piece
32 base screw
33 base rod or threaded base rod
34 friction rod or hollow friction rod
40 area of friction piece extending beyond base piece, also known as the extended section of the friction piece 31
41 gap area between friction piece 31 and base piece 30
50 end stopper
51 collar
52 end flange
53 end bevel
60 slant surface of free floating friction piece 31
61 slant surface of threaded base piece 30
62 internal threads of base rod 33
70 round stopper
80 shaft portion of base screw 32
90 flat end of friction piece 31

100 threaded end section of base rod 33, also known as the flat surface of the base rod.
110 center void area of free floating friction piece 31, the center void area 110 being smooth and not having treads
112 smooth interior wall of the free floating friction piece 31
120 center void area within base rod 33
130 center void area within hollow friction rod 34
150 outside diameter section of base piece 30. The outside diameter section 150 fits into the center void area 130 defined by the inside wall 210 of the friction rod 34
200 plane of the base piece
210 inside or interior wall of hollow friction rod 34
220 flat end of threaded base piece 30, the flat end 220 used to press against the flat screw head section 225 of the base screw 32
225 flat screw head section of the base screw 32
230 point of transition between the outside diameter section 150 and the start of the slant surface 61 of the threaded base piece 30
240 head section of base screw 32
250 threaded shaft section of base screw 32

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

The terms "clockwise", "counter clockwise", "rotation in a first direction" and "rotation in a second direction" are interchangeable and are relevant only in reference to each other. Typically, embodiments of the disclosed invention are rotated clockwise to lock the rods in place and counter clockwise to release the rods. However, opposite directions of rotation are contemplated.

While disclosed embodiments are generally directed toward the art of propping up car hoods and car trunk lids, other uses are contemplated as the disclosed assemblies solve many problems in the art of mechanical attachment.

Referring to FIG. 1, a base screw 32 has a shaft portion 80 with exterior threads, the exterior threads intersecting with interior threads of a threaded base piece 30. The exterior threads of the base screw 32 do rest within an interior void of a free floating friction piece 31, but, the void within the center of the friction piece 31 is greater in diameter as compared to the external threads of the base screw 32. Thus, the free floating friction piece 31 is not directly moved by a rotation of the base screw 32.

The free floating friction piece 31 comprises a flat end 90 (FIG. 5) near a base rod 33 and an opposite side, slanted at a 45 degree angle. The slanted side or slant surface 60 of the free floating piece may slide upon either of the two slant surfaces 61 of the base piece. The use of two slant surfaces 61 of the base piece 30 allows for the automatic alignment of the slant surfaces found upon the base piece and free floating friction piece.

In changes of rotational direction, one of the two slant surfaces 61 of the base piece 30 will be in position to line up with the slant surface 60 of the free floating friction piece 31. The use of two slant surfaces upon the base piece provides an advantage over the known prior art, as either direction of rotation is accommodated.

A subtle feature of the disclosure is the portion 40 of the free floating friction piece 31 that may extend beyond the outer circumference of the base piece 30. In FIG. 1 the extended section 40 may be caused by movement between the slant surfaces of the friction piece and the base piece. When the friction piece 31 extends beyond the outer sections of the base piece 30, the combined width of the base piece and extension area 40 may exceed that of the inside diameter of the hollow friction rod 34 and lock the friction rod and base rod 33.

Figure 2:
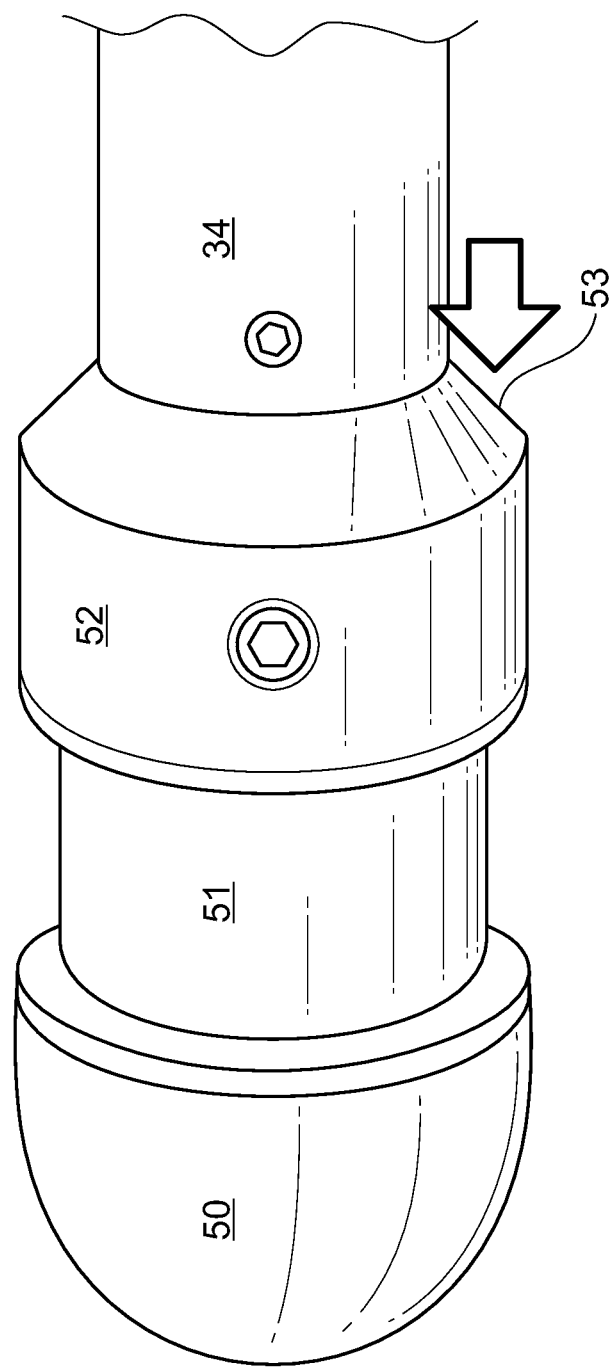
FIG. 2 is a perspective view of an end stopper and adjoining features.

Referring to FIG. 2 an end section is shown with an end stopper 50, collar 51, end flange 52, end bevel 53 in connection with telescopic member, such as a friction rod 34.

Figure 3:
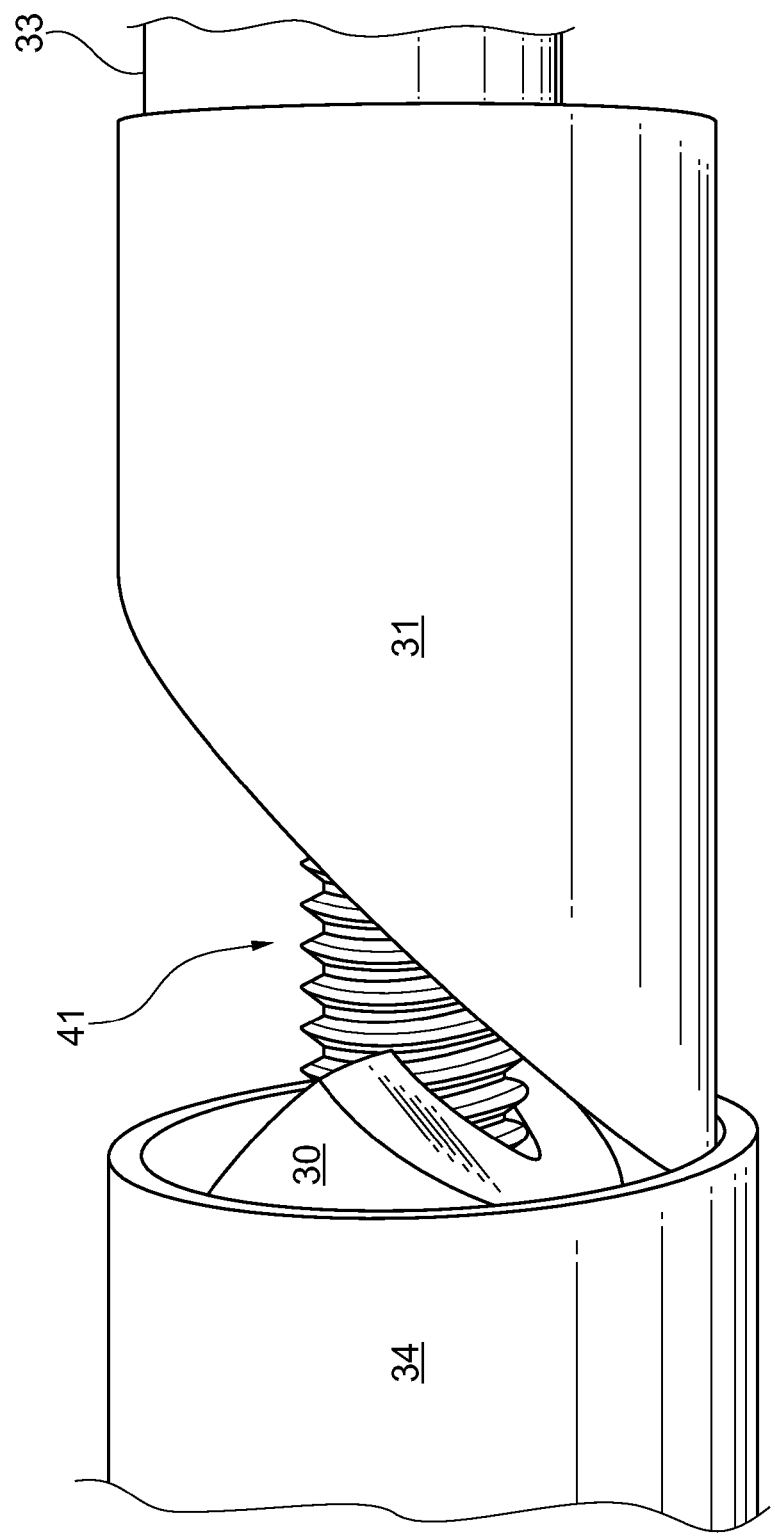
FIG. 3 is a perspective view of a free floating friction piece fitting inside a hollow friction rod.

FIG. 3 shows a gap area 41 between two slant surfaces of a base piece and friction piece 31. The gap area allows the friction piece to stay within the profile of the base piece and hence fit into the hollow friction rod 34.

Figure 4:
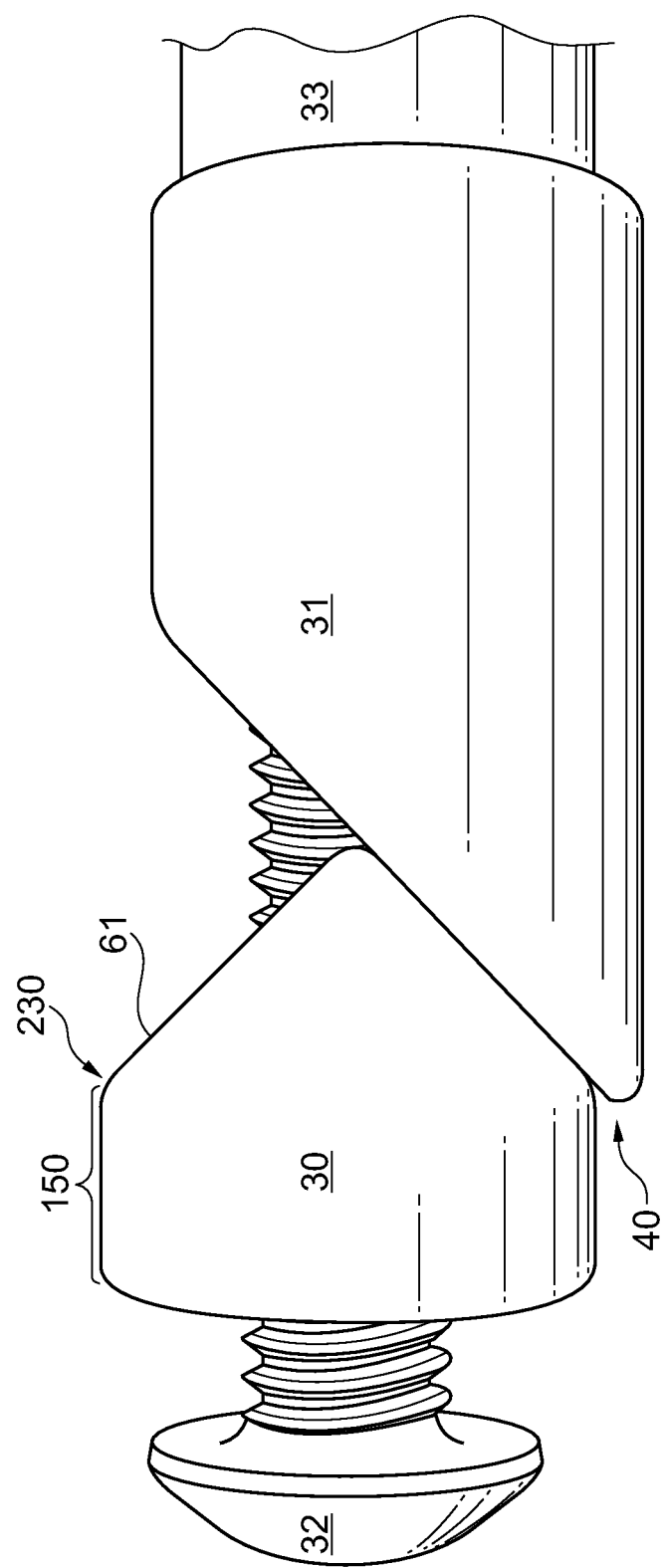
FIG. 4 is a perspective view of a free floating friction piece positioned to exceed the outside circumference of a threaded base piece.

FIG. 4 shows a friction piece 31 urged beyond the plane of the base piece 30. The extended section 40 of the friction piece 31 may secure the attached base rod 33 into a hollow friction rod 34.

Figure 5:
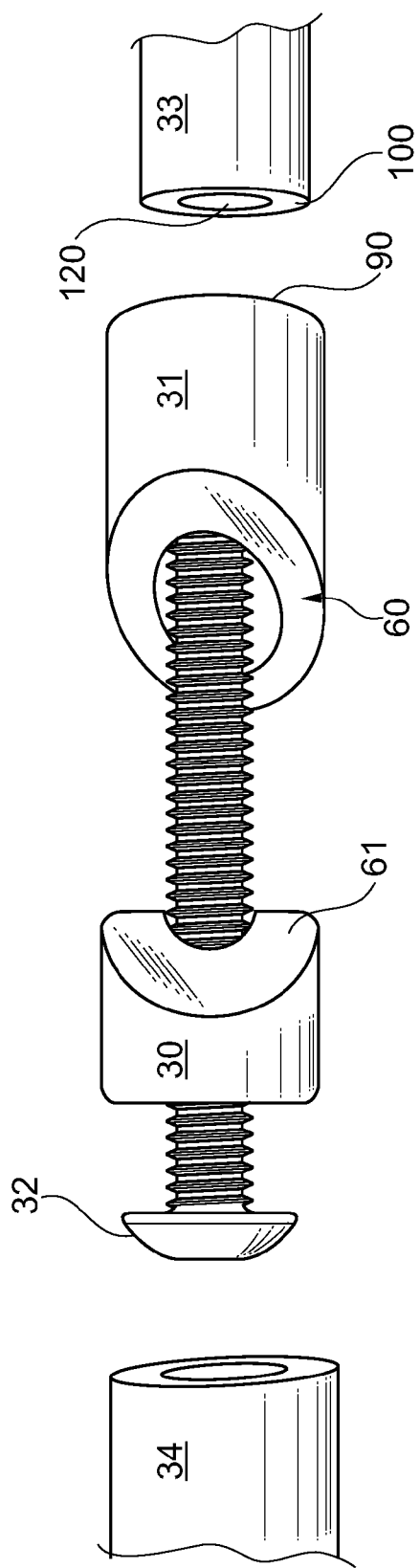
FIG. 5 is a perspective view of various components aligned for assembly

FIG. 5 shows a slant surface 61 of a threaded base piece 30 and a slant surface 60 of a floating friction piece 31. On the right hand side of the floating friction piece 31 a base rod 33 is shown. The flat side 90 of the friction piece 31 may rest upon the threaded end section 100 of the base rod 33.

The base rod 33 has a center void 120 that will accept the base screw 32. FIG. 1 shows the base rod 33 in attachment with the base screw 32, such that the flat ends of both the friction piece and base rod are urged together.

Figure 6:
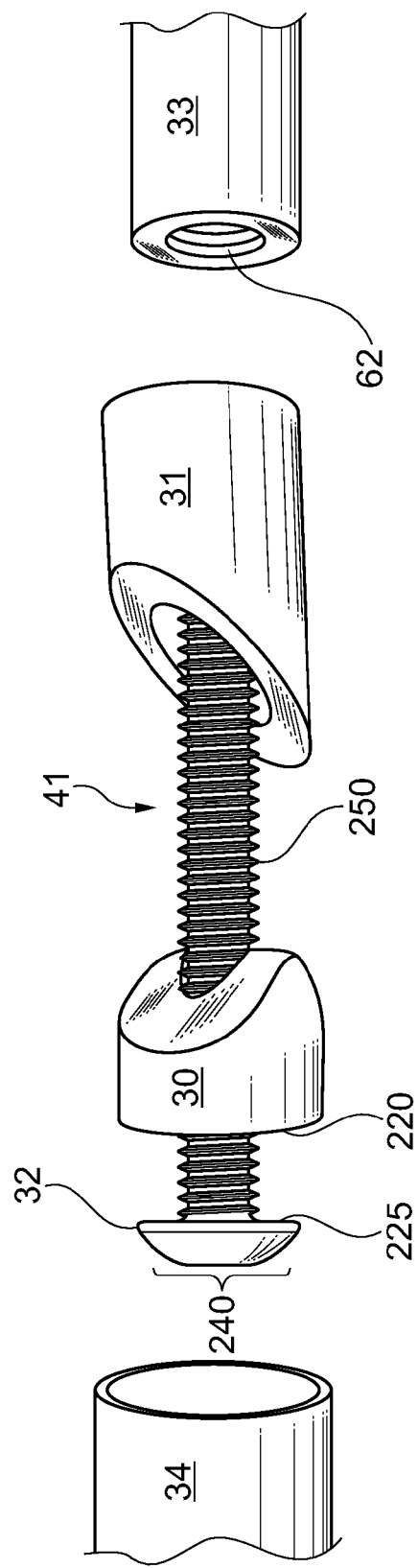
FIG. 6 is a perspective view of a base rod having internal threads to accept a base screw.

FIG. 6 shows a gap 41 between a threaded base piece 30 and a floating friction piece 31. Also, the internal threads 62 of the base rod 33 are shown. The base screw 32 is shown with a flat screw head section 225 that may press upon the flat end 220 of the threaded base piece 30.

Figure 7:
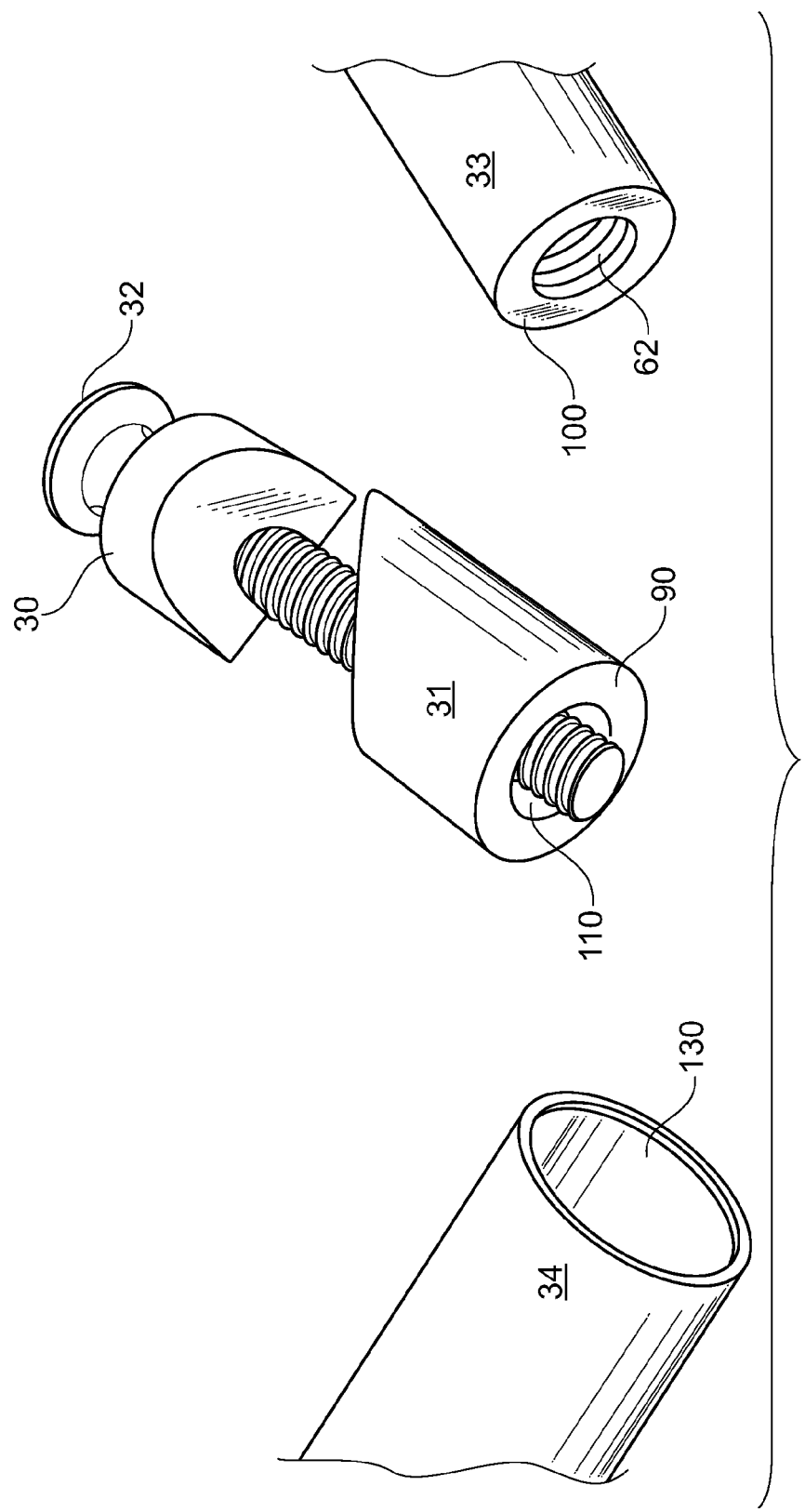
FIG. 7 is a perspective view of several components of one embodiment of the disclosure.

FIG. 7 shows a lack of threads within the center void 110 of a free floating friction piece 31. A center void area 130 of the hollow friction rod 34 is shown.

Figure 8:
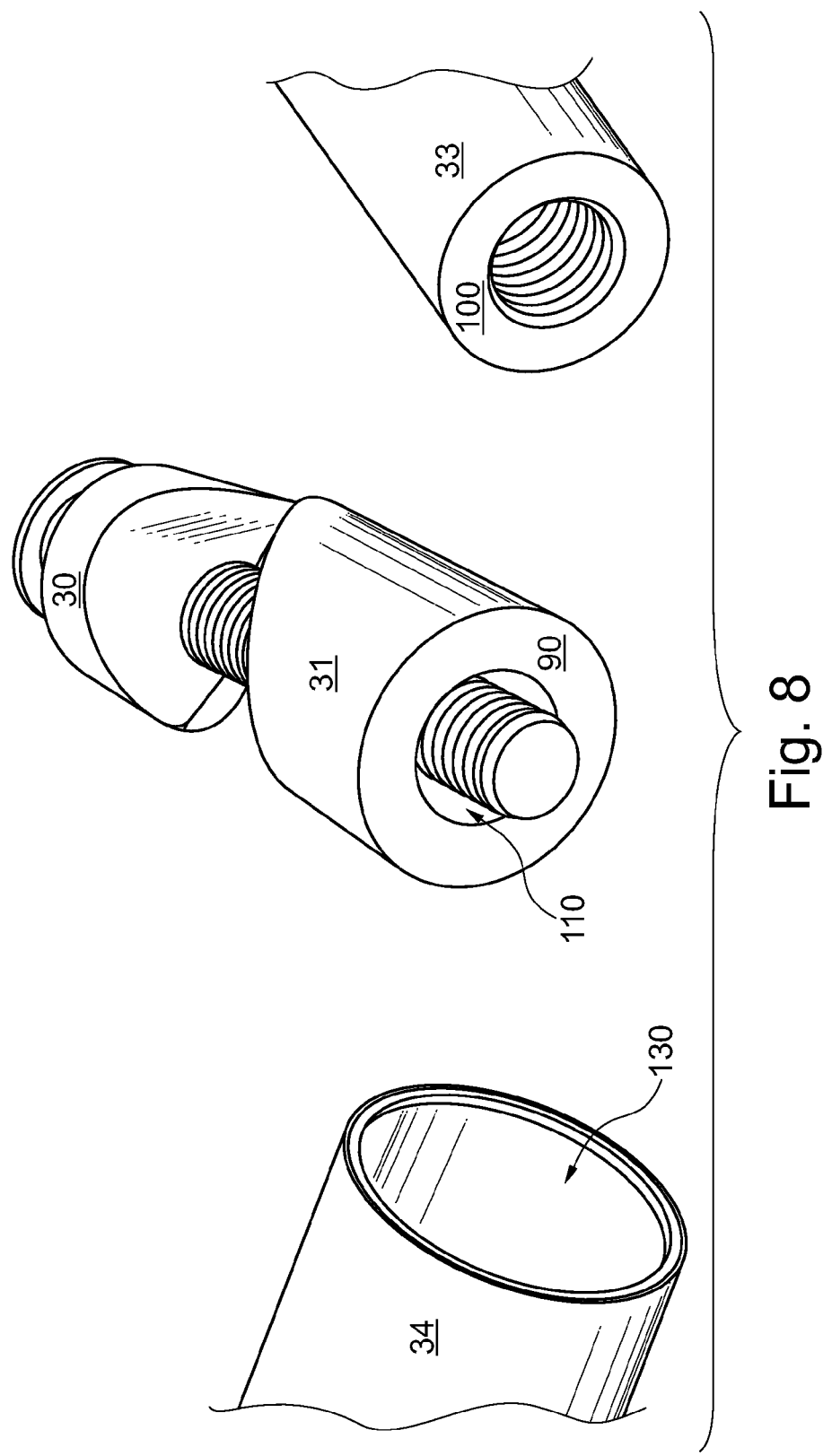
FIG. 8 is an alternative perspective view of several components of one embodiment of the disclosure.

FIG. 8 shows another view of the internal void 110 of a free floating friction piece 31. Here again, the internal void 110 area of the free floating friction piece does not have threads. In contrast, the base piece 30 is shown threaded into the base screw 32.

Figure 9:
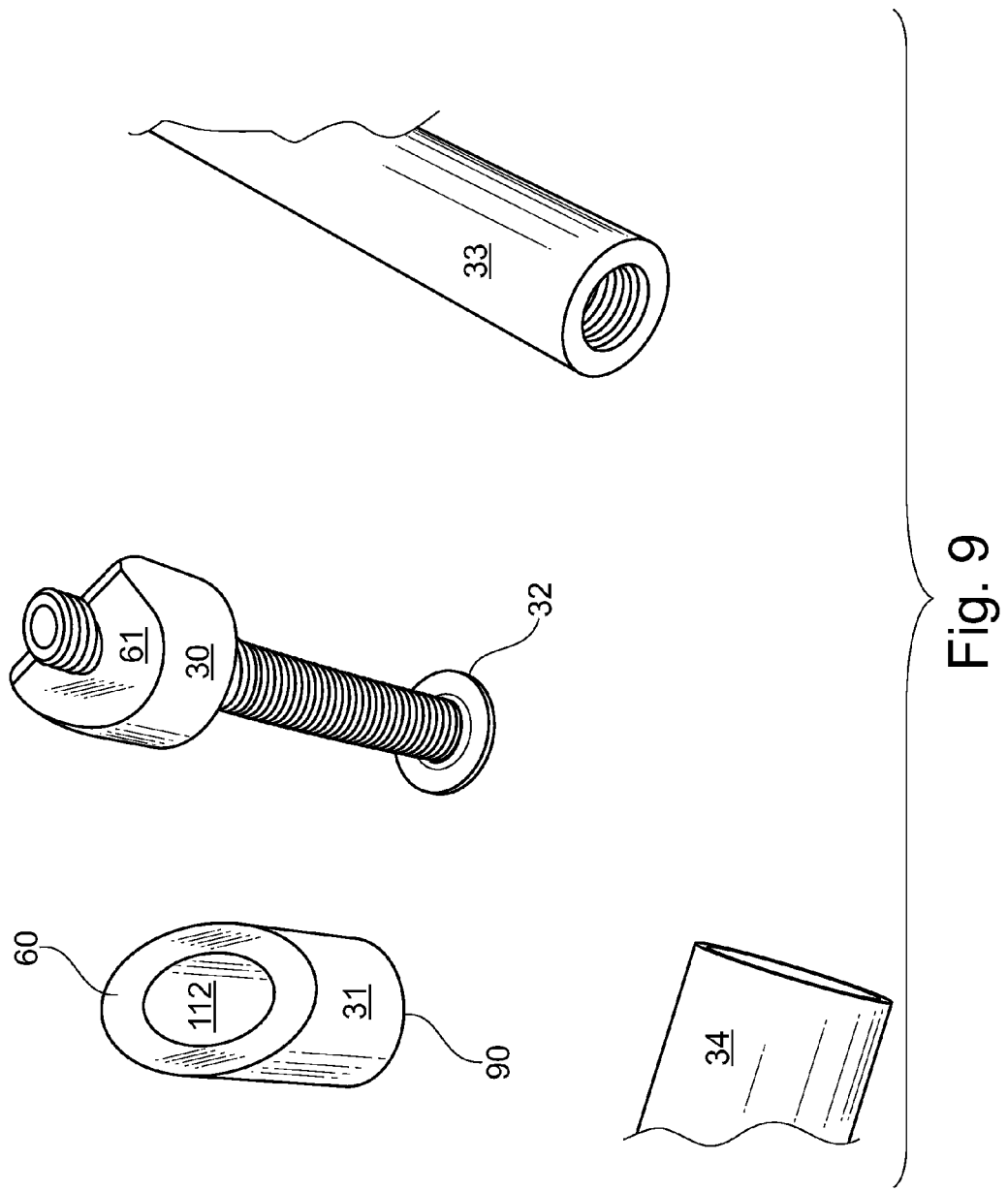
FIG. 9 is a perspective view of various disclosed components.

FIG. 9 shows a threaded relationship between a base screw 32 and a threaded base piece 30. A free floating friction piece 31 is shown resting upon its flat side 90. The free floating friction piece 31 is shown with one slant surface 60.

Figure 10:
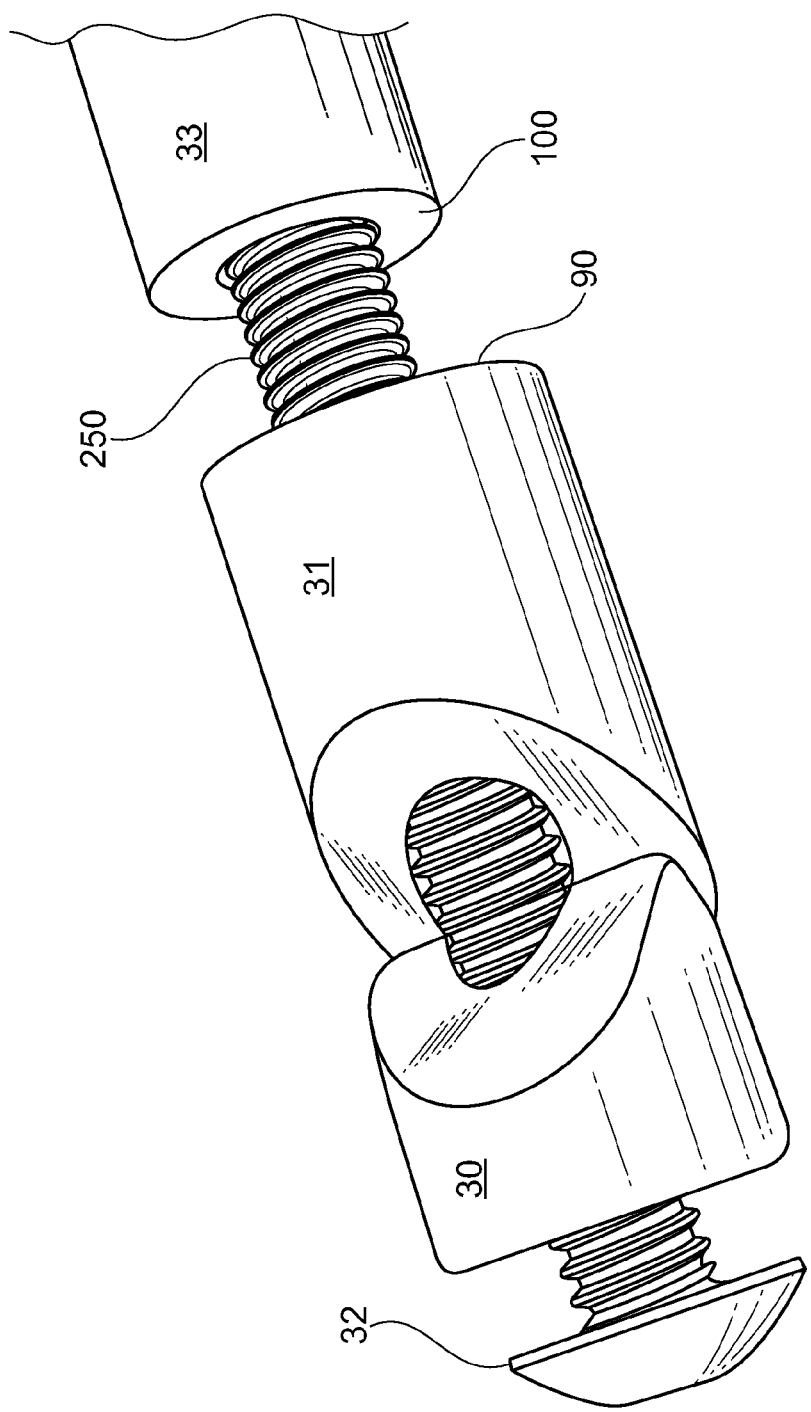
FIG. 10 is a perspective view of a base screw screwed into a base rod, with the base screw threaded into a base piece and with the base screw loosely holding a free floating friction piece.

FIG. 10 shows a perspective view of a base screw 32, base piece 30 and floating friction piece 31. A gap can be seen between the base screw 32 and the center void within the free floating friction piece 31.

Figure 11:
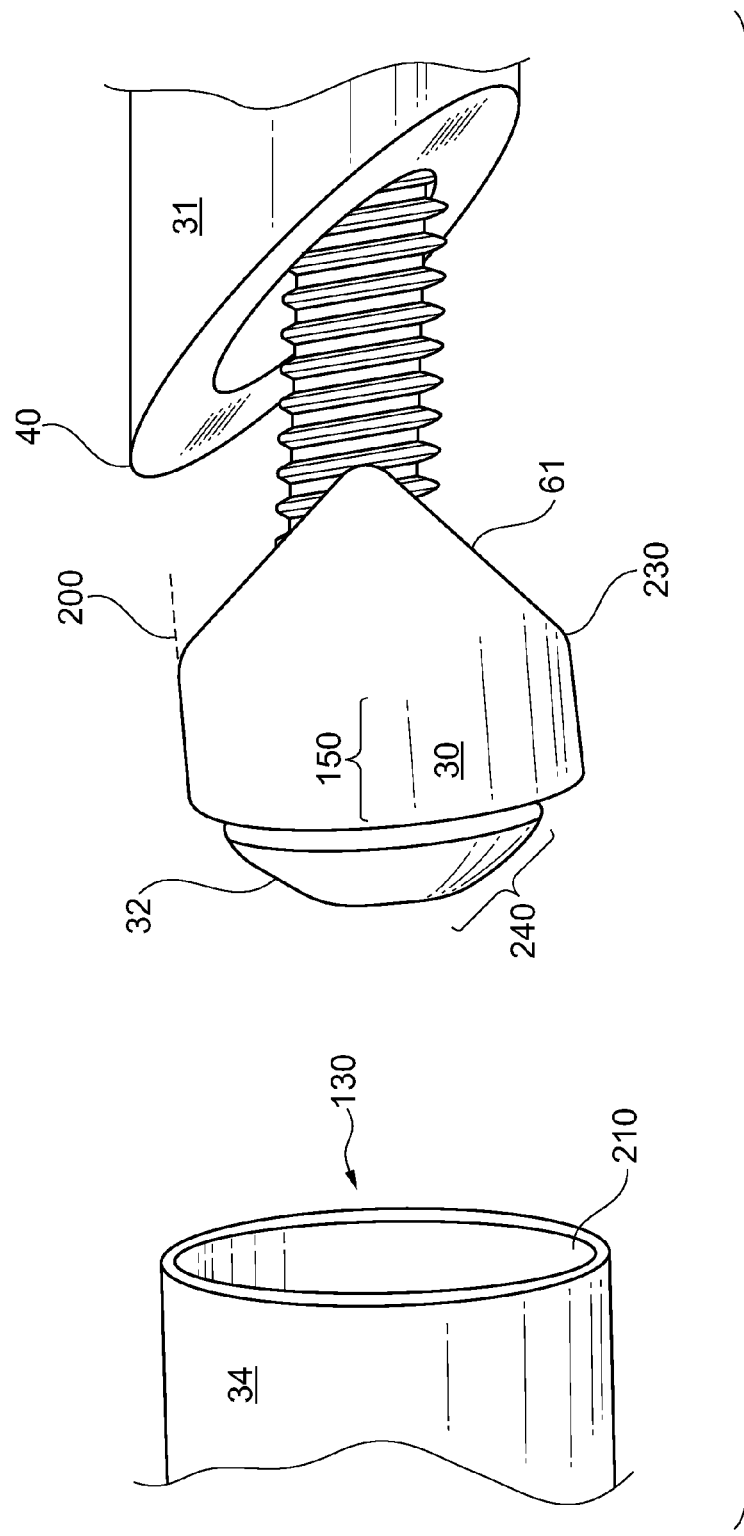
FIG. 11 is a perspective view of friction rod next to a base screw.

FIG. 11 shows a threaded base piece 30 in alignment with the center void 130 of a hollow friction rod 34. The extended section 40 of the free floating friction piece 31 will extend past the plane 200 of the base piece. The extended section 40 is urged into the inside wall 210 of the hollow friction rod 34.

Figure 12:
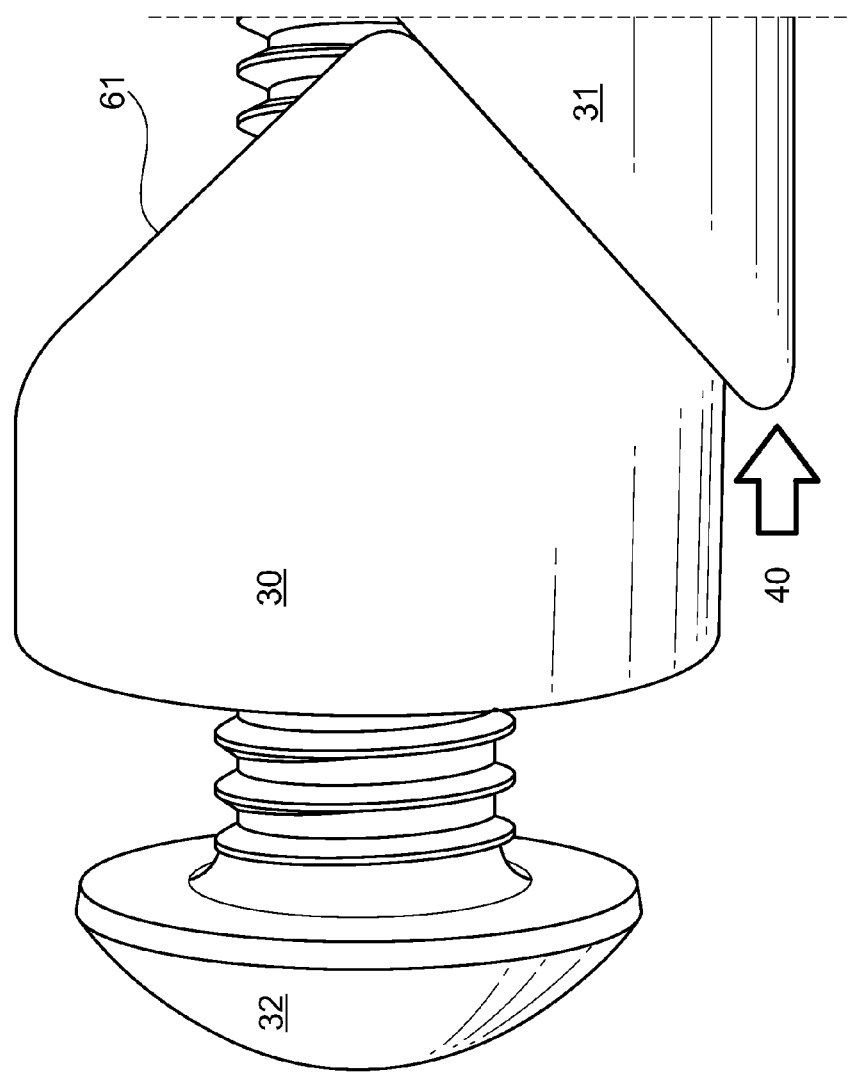
FIG. 12 is a perspective view of a base piece and free floating friction piece.

FIG. 12 shows a close up of the extended section 40 of friction piece 31. The extended section 40 is shown extending past the plane of the base piece 30.

Figure 13:
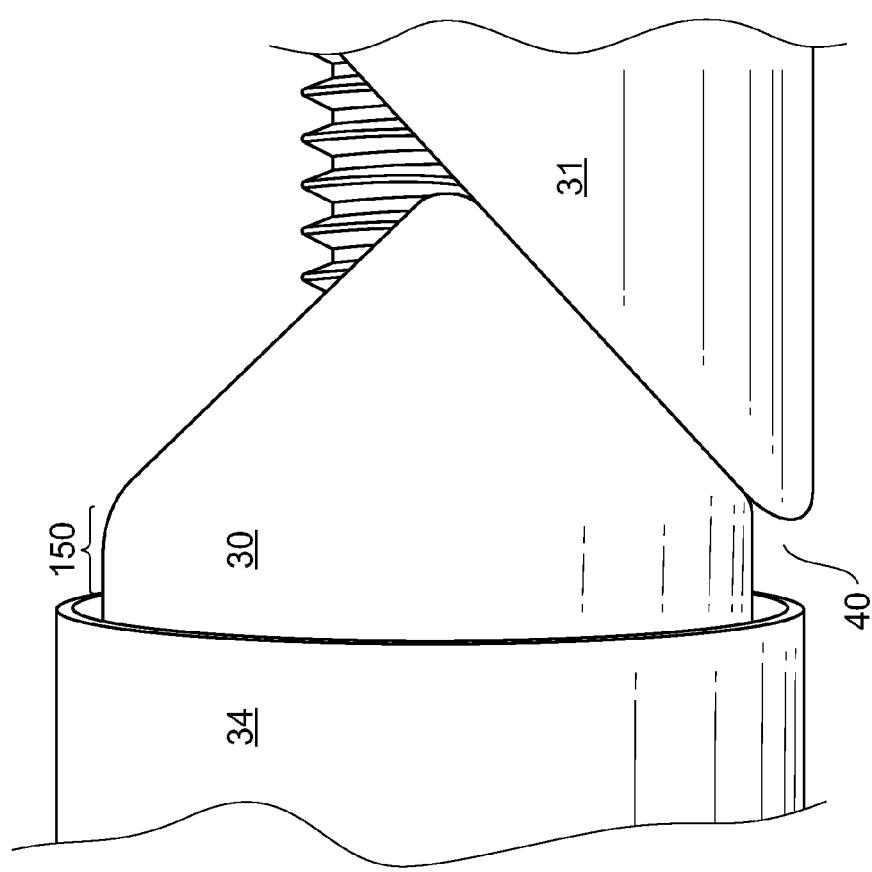
FIG. 13 is a perspective view of a base piece, free floating friction piece and friction rod.

FIG. 13 shows the extended area 40 of the friction piece to be outside of the diameter of the friction rod 34. As a user twists the base rod into the hollow friction rod 34, the extended area 40 slides outwardly and presses upon the inside wall of the hollow friction rod. The process may be reversed by a user. In the reversal process, the slanted side of the friction piece may move to either slanted side of the base piece.

Figure 14:
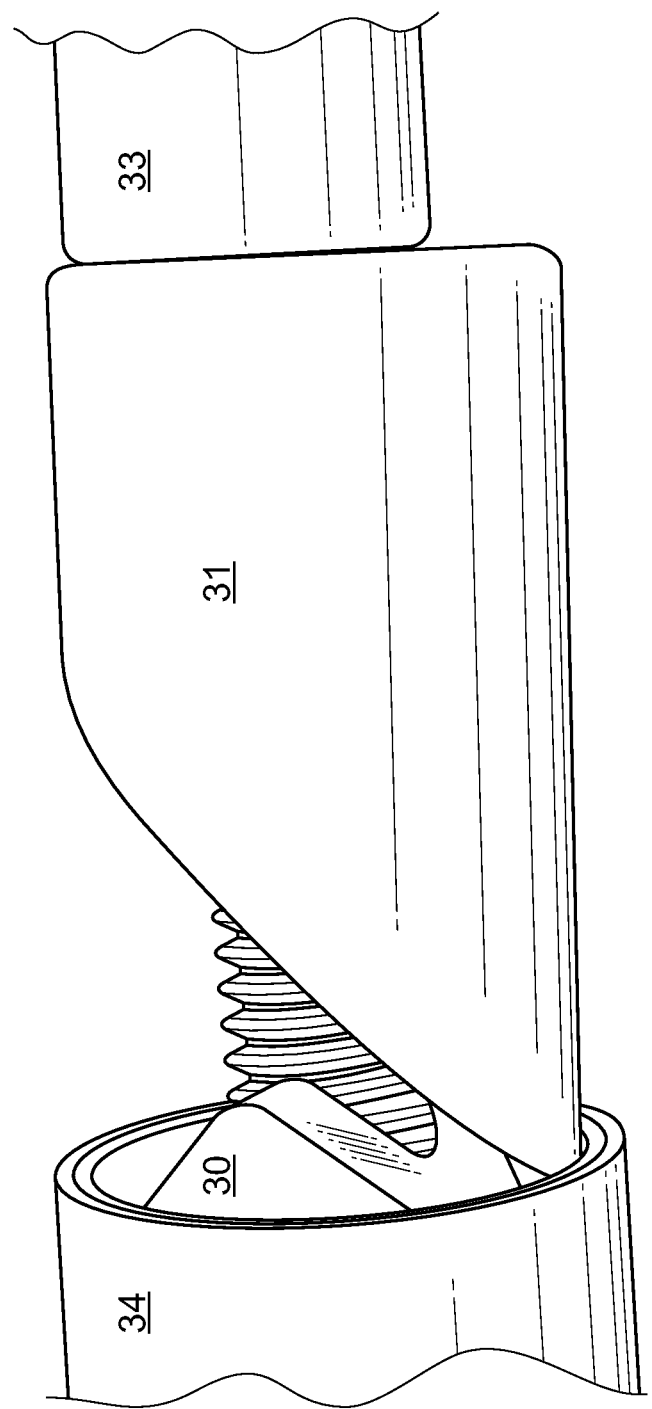
FIG. 14 is a perspective view of a base piece, free floating friction piece, friction rod and base rod.

FIG. 14 shows a friction piece 31 fitting into a friction rod 34. Note that the friction piece 31 is not in contact with the base piece 30.

Figure 15:
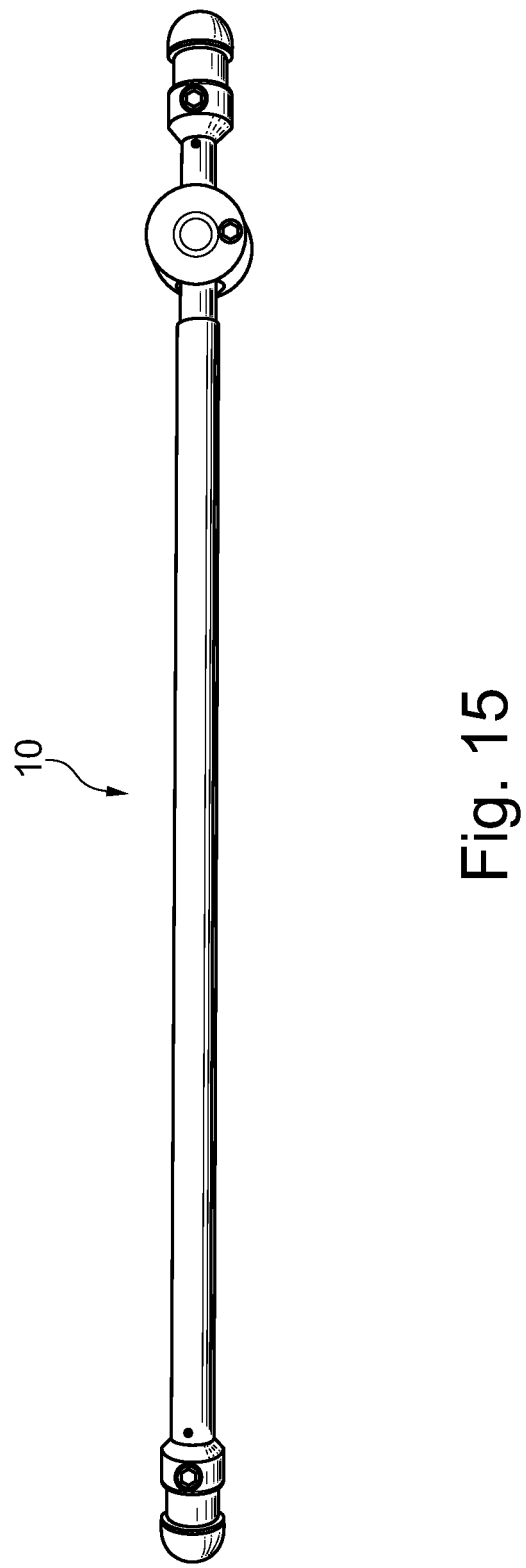
FIG. 15 is a perspective view of one embodiment of the disclosure.

FIG. 15 shows one contemplated embodiment of the disclosure. Two end pieces or end stoppers 50 on either side may be used to hold open a car hood or car trunk, but other uses are contemplated.

Figure 16:
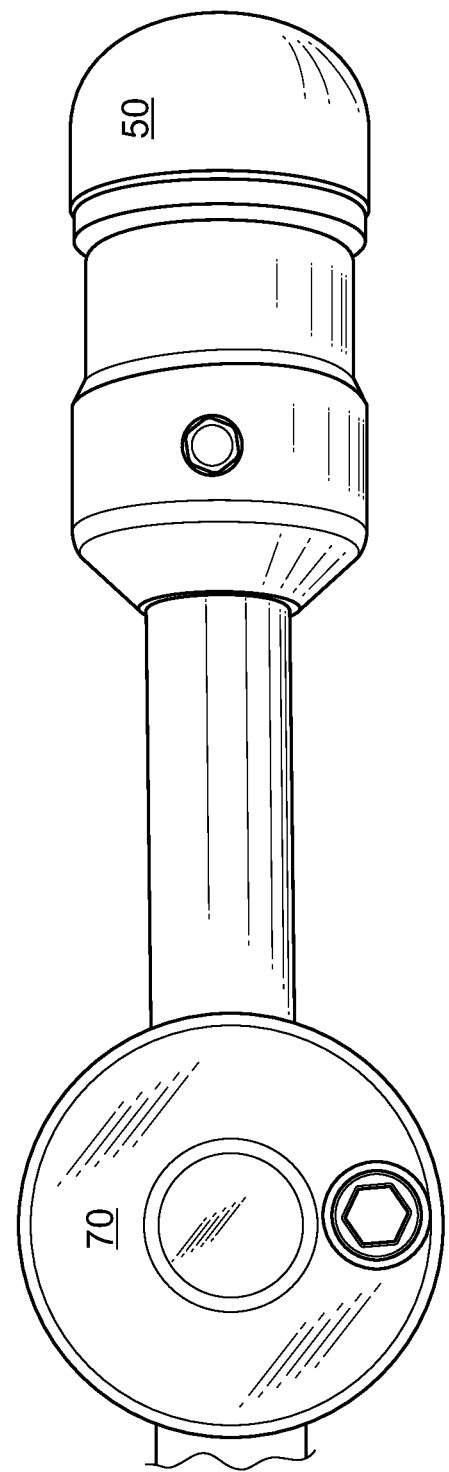
FIG. 16 is a perspective view of an end section and round stopper.

FIG. 16 shows a round stopper 70 that is sometimes used to cover the intersection or area between a friction rod and base rod.

Figure 17:
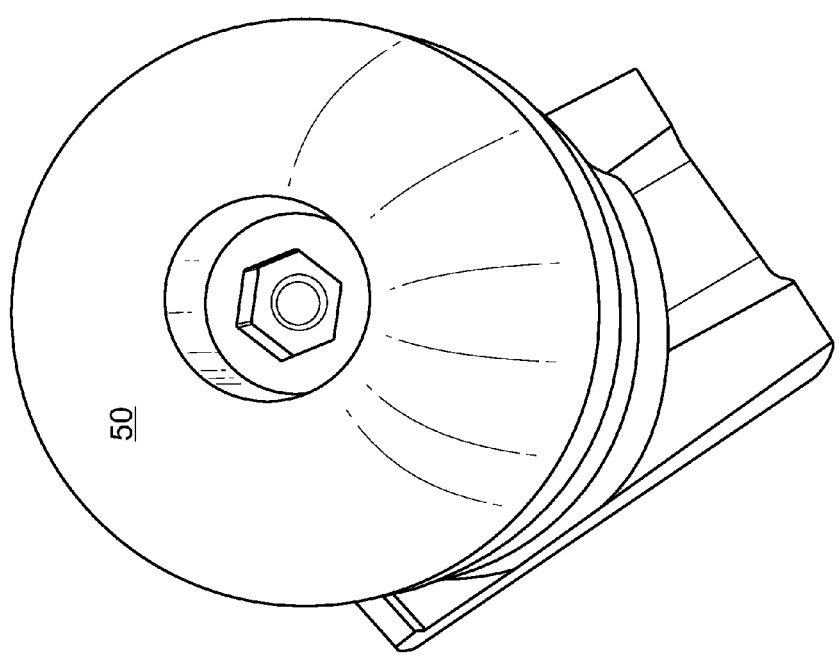
FIG. 17 is a perspective view of an end stopper.

FIG. 17 shows an end section of an end stopper 50.

The angle of slant 61 of the base piece and the angle of slant 60 of the free floating base piece may be in the range of 25 to 75 degrees. In the best mode known to date, the slants are in the range of 40 to 50 degrees. The working model is constructed with an approximate slant of 45 degrees, give or take three degrees.

Embodiments of the invention may include the following items:

Item 1. An adjustable rod system, the system comprising:

a) a base rod 33, the base rod comprising a cylinder with an interior void defined by interior threads, the base rod having an end section 100, the end section having a flat surface;

b) a free floating friction piece 31, having a shape of a cylinder with a longitudinal interior center void 110 defined by a smooth interior 210 wall, the free floating friction piece 31 having a flat end 90 on a first end and on a second end, having a slant section 60 angled in the range of 40 to 50 degrees;

c) a threaded base piece 30 having a shape of a cylinder with a longitudinal interior center void defined by internal treads, the threaded base piece 30 having a flat end 220 on a first end and a second end defined by two slant surfaces 61, the slant surfaces having an angle in the range of 40 to 50 degrees, the threaded base piece 30 having an outside diameter section 150 defined by the area between the flat end 220 and a point of transition 230 between the outside diameter section 150 and the start of the slant surface 61 of the threaded base piece 30;

d) a base screw 32 having a head section 240, an adjoining a flat screw head section 225, and a threaded shaft section 250, the treaded shaft section having threads compatible with:
i) the internal threads of the threaded base piece 30; and
ii) the internal threads 62 of the base rod 33; and e) a hollow friction rod 34 having a shape of a cylinder with a longitudinal interior center void 130 defined by an interior wall 210, the interior wall having sufficient diameter to accept the head section 240 of the base screw, the threaded base piece 30 and the free floating friction piece 31.

The system of item 1 wherein the hollow friction rod has sufficient diameter to accept the threaded base rod 33.

The system of item 1 wherein the flat end 90 of the free floating friction piece 31 is configured to abut the flat end section 100 of the base rod 33.

The system of item 1 wherein the threaded base rod 33 and the hollow friction rod include stoppers 50, the stoppers comprising hemisphere shaped components.

A kit comprising:

a) a base rod 33, the base rod comprising a cylinder with an interior void defined by interior threads, the base rod having an end section 100, the end section having a flat surface;

b) a free floating friction piece 31, having a shape of a cylinder with a longitudinal interior center void 110 defined by a smooth interior 210 wall, the free floating friction piece 31 having a flat end 90 on a first end and on a second end, having a slant section 60 angled in the range of 40 to 50 degrees;

c) a threaded base piece 30 having a shape of a cylinder with a longitudinal interior center void defined by internal treads, the threaded base piece 30 having a flat end 220 on a first end and a second end defined by two slant surfaces 61, the slant surfaces having an angle in the range of 40 to 50 degrees, the threaded base piece 30 having an outside diameter section 150 defined by the area between the flat end 220 and a point of transition 230 between the outside diameter section 150 and the start of the slant surface 61 of the threaded base piece 30;

d) a base screw 32 having a head section 240, an adjoining a flat screw head section 225, and a threaded shaft section 250, the treaded shaft section having threads compatible with:
i) the internal threads of the threaded base piece 30; and
ii) the internal threads 62 of the base rod 33; and e) a hollow friction rod 34 having a shape of a cylinder with a longitudinal interior center void 130 defined by an interior wall 210, the interior wall having sufficient diameter to accept the head section 240 of the base screw, the threaded base piece 30 and the free floating friction piece 31.

What is claimed is:

1. An adjustable telescopic rod system for propping open a vehicle hood or trunk, the system comprising:

a base rod comprising a cylindrical body with a longitudinally-extending interior void defining a longitudinal axis, the base rod having a hemispherical-shaped end stopper disposed at a first longitudinal end of the base rod, and having an end section having a flat radially-extending abutment surface disposed at a second longitudinal end of the base rod, female threads being concentrically formed within the abutment surface;

a free-floating friction piece comprising a cylindrical body with a longitudinally-extending interior void defining by a smooth interior wall, the friction piece having a flat radially-extending abutment surface at a first longitudinal end of the friction piece, and having a slanted abutment surface angled in the range of 40 to 50 degrees relative to the longitudinal axis at a second longitudinal end of the friction piece;

a threaded base piece comprising a cylindrical body with a longitudinally-extending interior void having female threads, the base piece having two opposing slanted abutment surfaces at a first longitudinal end of the base piece, the opposing slanted abutment surfaces having an angle in the range of 40 to 50 degrees relative to the longitudinal axis, and having a flat radially-extending surface at a second longitudinal end of the base piece, the base piece having an outer cylindrical surface extending between the flat radially-extending surface and the opposing slanted abutment surfaces of the base piece;

a base screw having a head and a threaded shaft, the threaded shaft having male threads compatible with the female threads of the base piece and the female threads of the base rod, the threaded shaft being threaded through the base piece, extending through the interior void of the friction piece such that a radial gap exists between the threaded shaft and the interior wall of the friction piece, and being threaded into the base rod to non-rotatably fix the base piece and the base screw relative to the base rod;

wherein the flat abutment surface of the friction piece slidably abuts the abutment surface of the base rod, and the slanted abutment surface of the friction piece slidably abuts one of the opposing slanted abutment surfaces of the base piece; and a hollow friction rod comprising a cylindrical body with a longitudinally-extending interior void defining an interior wall, the friction rod having an opening disposed at a first longitudinal end of the friction rod, and having a hemispherical-shaped end stopper disposed at a second longitudinal end of the friction rod;

wherein the interior wall and opening of the friction rod has sufficient diameter to telescopically receive the base rod, the base screw, the base piece and the friction piece;

wherein when the base rod is rotated about the longitudinal axis relative to the friction rod, the slanted abutment surface of the friction piece slidably engages one of the opposing slanted abutment surfaces of the base piece to slide the friction piece radially outward beyond an outer cylindrical surface of the base rod and the outer cylindrical surface of the base piece, and such that an outer cylindrical surface of the friction piece frictionally engages the interior wall of the friction rod to lock the friction rod relative to the base rod;

whereby in either direction of rotation about the longitudinal axis, the slanted abutment surface of the friction piece slidably engages one of the opposing slanted abutment surfaces of the base piece to slide the friction piece radially outward.

\* \* \* \* \*